United States Patent [19]

Cok

[11] Patent Number: 5,285,524
[45] Date of Patent: Feb. 8, 1994

[54] NEURAL NETWORK WITH DAISY CHAIN CONTROL

[75] Inventor: Ronald S. Cok, Rochester, N.Y.

[73] Assignee: Eastman Kodak Company, Rochester, N.Y.

[21] Appl. No.: 974,773

[22] Filed: Nov. 12, 1992

Related U.S. Application Data

[62] Division of Ser. No. 632,862, Dec. 24, 1990, Pat. No. 5,214,474.

[51] Int. Cl.⁵ .............................................. G06F 15/18
[52] U.S. Cl. ........................................ 395/27; 395/11
[58] Field of Search ............................. 395/11, 24, 27

[56] References Cited

U.S. PATENT DOCUMENTS

| | | | |
|---|---|---|---|
| 4,660,166 | 4/1987 | Hopfield | 364/807 |
| 4,796,199 | 1/1989 | Hammerstrom et al. | 364/513 |
| 4,807,168 | 2/1989 | Moopenn et al. | 364/602 |
| 4,809,193 | 2/1989 | Jourjine | 364/513 |
| 4,918,617 | 4/1990 | Hammerstrom et al. | 364/513 |
| 5,095,443 | 3/1992 | Watanabe | 395/11 |
| 5,107,442 | 4/1992 | Weideman | 395/11 |
| 5,142,666 | 8/1992 | Yoshizawa | 395/27 |
| 5,165,010 | 11/1992 | Masuda | 395/27 |
| 5,170,463 | 12/1992 | Fujimoto | 395/11 |
| 5,201,029 | 4/1993 | Jackson | 395/27 |
| 5,212,767 | 5/1993 | Higashimo et al. | 395/11 |

FOREIGN PATENT DOCUMENTS 2205422A  5/1988  United Kingdom ......... G06F 12/02

OTHER PUBLICATIONS

A wafer scale integration neural network utilizing completely digital circuits; Yasunaga et al; Proc. IJCNN; vol. 2; pp. 213-217; Jun. 18, 1989.

J. J. Vidal, J. C. Pemberton, J. M. Goodwin, *Implementing Neural Nets with Programmable Logic*, pp. 539-545.

T. R. Martinez, *Digital Neural Networks*, pp. 681-684.

J. J. Vidal, *Implementing Neural Nets with Programmable Logic*, IEEE Transactions on Acoustics, Speech, and Signal Processing, vol. 36, No. 7, pp. 1180-1190, Jul. 1988.

L. A. Akers, M. R. Walker, D. K. Ferry, R. O. Grondin, *Limited Interconnectivity in Synthetic Neural Systems*, pp. 407-417.

D. Hammerstrom, *Solving Connectivity Problems in VLSI Neuron Nets*, pp. 395-407.

J. I. Raffel, *The Application of Wafer-Scale Technology to Neuromorphic Systems*, pp. 202-222.

H. P. Graf, L. D. Jackel, W. E. Hubbard, *VLSI Implementation of a Neural Network Model*, pp. 41-49.

*Primary Examiner*—Allen R. MacDonald
*Attorney, Agent, or Firm*—Mark Z. Dudley

[57] ABSTRACT

The present invention is a direct digitally implemented network system in which neural nodes 24, 26 and 28 which output to the same destination node 22 in the network share the same channel 30. If a set of nodes does not output any data to any node to which a second set of nodes outputs data (the two sets of nodes to not overlap or intersect), the two sets of nodes are independent and do not share a channel and have separate channels 120 and 122. The network is configured as parallel operating non-intersecting segments or independent sets where each segment has a segment communication channel or bus 30. Each node in the independent set or segment is sequentially activated to produce an output by a daisy chain control signal. The outputs are thereby time division multiplexed over the channel 30 to the destination node 22.

6 Claims, 10 Drawing Sheets

FIG.1
*PRIOR ART*

INPUT NODES

FIG. 2
*PRIOR ART*

OUTPUT NODES

HIDDEN NODES

INPUT NODES

NEURAL NETWORK WITH DAISY CHAIN CONTROL

This is a Divisional of application Ser. No. 632,862, filed 24 Dec. 1990 now U.S. Pat. No. 5,214,747.

BACKGROUND OF THE INVENTION

1. Field of the Invention

The present invention is directed to a method and apparatus which provides very simple segmentation, control and interconnection of any neural network and, more particularly, to a system which segments a digital neural network according to its interconnectivity and provides a daisy chained control signal for each segment together with time-division multiplexed communication buses connected to the nodes in the segment.

2. Description of the Related Art

Neural net computing structures are very useful for modeling non-linear problems. Such structures have found wide application in many fields. However, the use of neural nets in real applications is constrained because of their implementation difficulty. General purpose and special purpose computing machines which can simulate the action of a neural net are readily available but are satisfactory only for low performance systems. Current computing technology cannot meet the needs for high speed neural net implementations.

Attempts to build neural net structures directly (rather than simulate such nets with a general purpose computer) face two fundamental problems: size and interconnectivity. Neural nets tend to be very large and very highly interconnected. Therefore, a successful neural net implementation must find a way to build each node of a neural net very efficiently and find a way to connect them very efficiently.

Each node in a neural net implements a transfer function which has many inputs and a single output. The transfer function can be written as:

$$F_N = f(x_0, x_1, x_2, x_3 \ldots x_n) \quad (1)$$

where the subscripted x parameters represent the input values to the node. Each node in a neural net does not have to implement the same function. However, one common approach to the design of neural nets does implement the same function in every node. This function has the form:

$$F_N = 1/(1 + e^y) \text{ where } y = - \sum_{i=0}^{i=N} (X_i W_i) \quad (2)$$

Other neural network nodes perform a function such as:

$$F(X_i) = f\left( \sum_{i=0}^{i=N} X_i W_i \right) \quad (3)$$

and still others compare the right side of equation (3) to a threshold to determine whether to produce on output.

Figure 1:
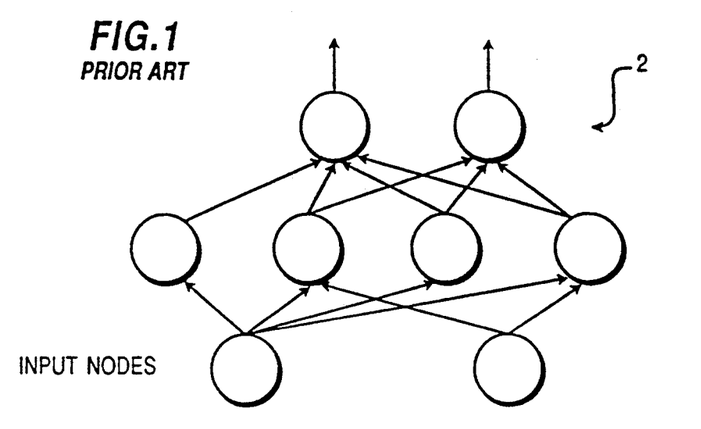
FIG. 1 illustrates a conventional neural network.

Neural networks 2 are often represented as shown in FIG. 1. Each circle represents one node and the arrows show the flow of inputs and outputs from one node to another. The input nodes do not implement any mathematical operation and simply serve to show the flow of data.

Figure 2:
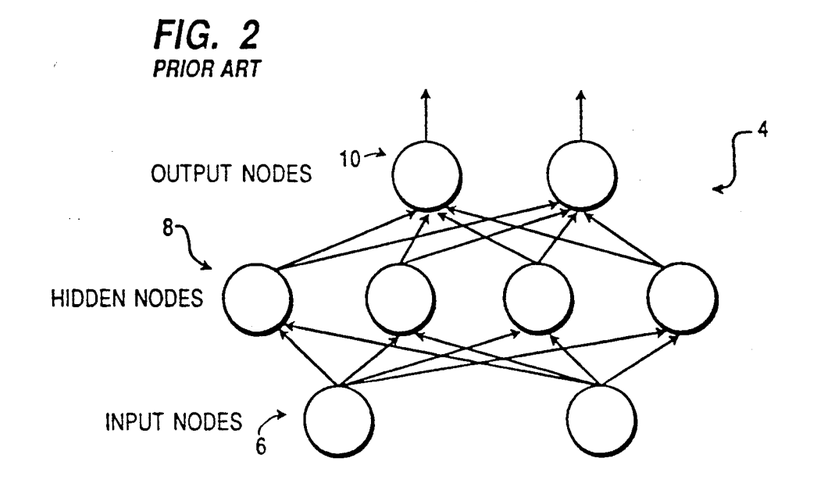
FIG. 2 depicts a classic three layer neural network.

The most common interconnection scheme for neural networks 4 is shown in FIG. 2. In this approach a net comprises three layers, an input layer 6, a second layer 8 (usually called the hidden layer) which receives data from the input layer, and an output layer 10 which receives data from the hidden layer 8 and generates output values. In its classic form, this approach requires that every node in the hidden layer 8 receive data from every input node, and that every output node receive data from every hidden node. Each node implements the identical function. For this classic approach, it is easy to see that the number of interconnects will be the sum of the products of each successive pair of layers. If every layer has one thousand nodes, there will be two million interconnects.

Figure 3:
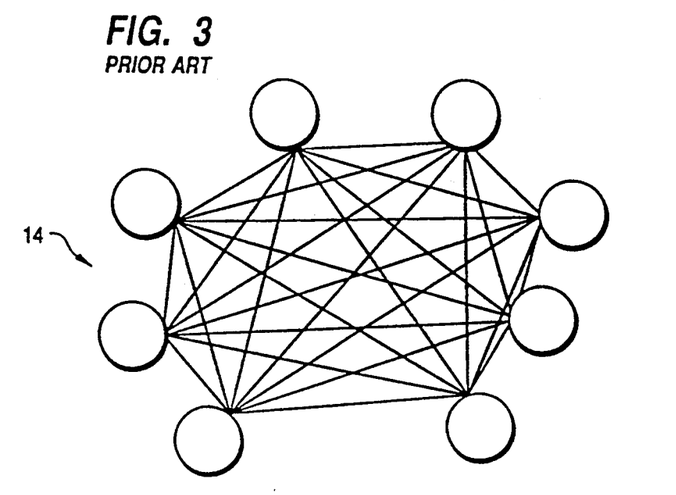
FIG. 3 shows a completely connected network.
Figure 4:
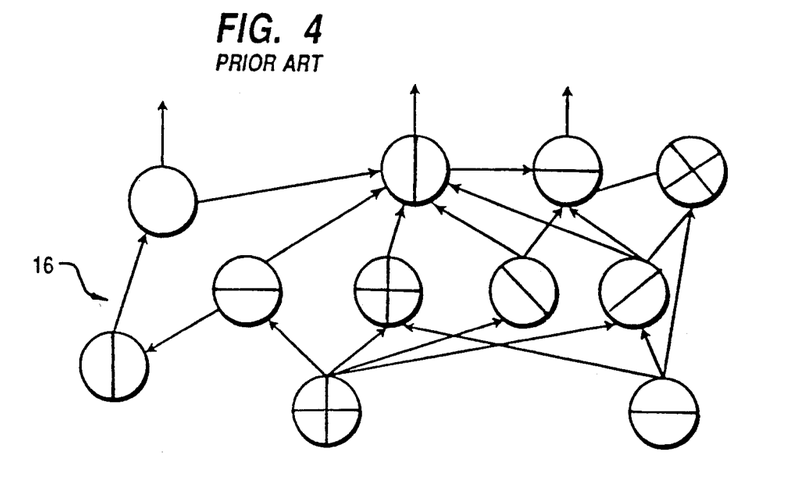
FIG. 4 illustrates an arbitrarily connected network.

It is important to note that not every neural network is of the form in FIG. 2. Some networks are much more generic and permit any set of interconnections to be made between any set of nodes, and for any node to implement any function. FIG. 3 shows a network 14 of identical nodes which are totally interconnected (a Hopfield net) and FIG. 4 shows an arbitrarily connected network 16 with seven arbitrary transfer functions.

It is easy to understand, from the above discussion, why neural nets simulated on computers require so much computing power, even on computers specially designed for neural net simulations. It is also clear that the task of physically implementing a large network is quite difficult.

A directly implemented neural network is one in which a physical processor node implements every node in a neural net, that is, a physical processor exists for each node. The problem of interconnection must be dealt with whenever direct implementations of neural nets are built. Any direct implementation of such nets faces four problems which the present invention either overcomes or circumvents.

The first problem is simply that of interconnection. Presently, workers deal with the problem by reducing the interconnectivity of the net so that, for example, each node can only receive data from ten other nodes. This makes it impossible to build many networks including the classic one described above with respect to FIG. 2.

A second problem is that of flexibility. Because neural networks vary so much in structure, and because the structure of a net needed to solve a particular problem is generally unknown at the outset (which is why the nets must "learn"), it is important that any hardware implementation provide variability in net structure.

A third problem is that of construction. Because of the huge size of neural nets, it is also very important that any structure built be very simple and regular. For most present-day implementations, if the net changes slightly, the computing machine must be abandoned (if the nodes are realized on an integrated circuit), or physically and extensively rewired to accommodate the structural changes.

A fourth problem is that of the efficient use of resources. Equations 2 and 3 show a sum of products as part of a node function. In an analog implementation these multiple inputs can be summed simultaneously with the appropriate circuitry. Digital logic is not generally designed to sum many input simultaneously and if attempted would be both expensive and inflexible. Because digital implementations do not process simultaneous inputs, providing simultaneous inputs is inefficient. Hence, a direct implementation of FIG. 1 is inefficient for a digital system.

SUMMARY OF THE INVENTION

It is an object of the present invention to increase the flexibility of a hardware implementation of neural networks.

It is another object of the present invention to facilitate any interconnectivity desired in a neural network.

It is also an object of the present invention to provide a method of configuring a neural network to optimize parallel processing.

It is a further object of the present invention to allow a simple, regular circuit structure throughout the neural network.

It is an object of the present invention to reduce the number of physical connections required to implement any neural network.

It is still another object of the present invention to efficiently utilize the computing resources within the network.

It is also an object of the present invention to provide an integrated circuit architecture for multiple nodes that allows the flexibility and efficiency mentioned above.

It is still another object of the present invention to control the sequence of execution, output and data routing in the network in a simple, easy to implement method.

The above objects can be accomplished by a system in which neural nodes which output to the same destination node in the network are considered to be sharing the same channel. If a set of nodes does not output any data to any node to which a second set of nodes outputs data, the two sets of nodes are independent and do not share a channel. The network is thereby segmented into the independent sets. Each node in an independent set is sequentially activated to produce an output by a daisy chain control signal. The outputs are thereby time division multiplexed over the channel to the destination node. The nodes in each set are implemented on integrated circuits which have their outputs connected to the segment channel. Each node includes a memory array that stores the weights applied to each input via a multiplier. The multiplied inputs are accumulated and applied to a lookup table that performs any threshold comparison or transfer function operation. The output of the lookup table is placed on a common bus serving as the channel for the independent set of nodes by a tristate driver controlled by the daisy chain control signal.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

The present invention is directed to an apparatus and method for arbitrarily connected neural networks preferably directly implemented digitally. The output of each node in a network is connected to a channel. All nodes which output data to a common node must share a channel. If a set of nodes does not output any data to any node to which a second set of output nodes outputs data, the two sets of nodes are independent and do not share a channel. A separate channel is used to accommodate each independent set of nodes. Each node in a set is connected by an output control signal line. The output of the node is inhibited until the output control signal becomes active. The output control signal is connected and applied serially from one node to the next node in the same independent set in a daisy chain fashion. As the output of each node in turn is activated, the signal is propagated to the next node. This allows each independent set of nodes to operate in parallel and to automatically multiplex that nodes data onto the common channel without interference from any of the other nodes in the network.

For the broader aspects of this invention, a node can be considered to consist of three parts, an input mechanism, a processing mechanism, and an output mechanism. Data will be read in by the input mechanism, processed, and then written out by the output mechanism.

As discussed above, nodes in the network are connected via a set of communication channels. Each channel is associated with the output of a single set of nodes. The sets of nodes are mutually exclusive, that is, no output of a node which is found in one set is found in any other set. Every node must belong to some set. The sets are defined by the interconnection of the network. Any node which outputs data to the same node to which a second node also outputs data is in the same set. Each node in a set is additionally connected to another node in the same set via an output daisy chain control signal. This signal propagates from one node to the next controlling the order in which each node can output data onto the corresponding channel. Each channel operates independently and in parallel with all others.

The communication channels as well as the input and output mechanisms described herein are data serial. Each individual datum is read or written in turn. Thus, the channel on which the data are read or written is time division multiplexed. The channel itself may be one or many bits wide allowing a single datum to be communicated in one or many packets.

Figure 5:
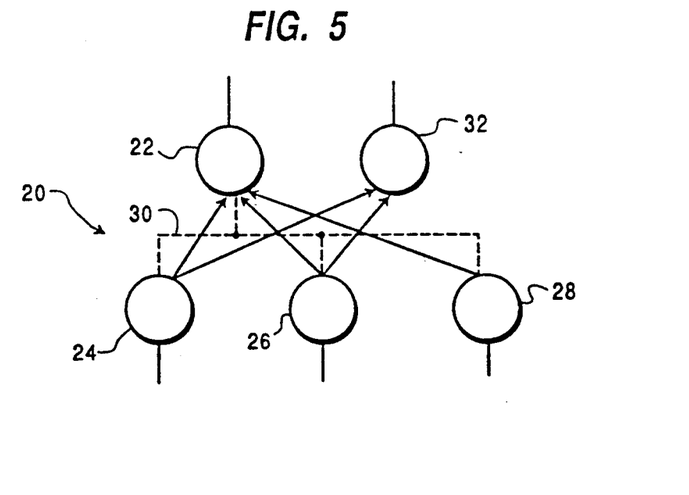
FIG. 5 depicts a network to which the present invention is applied.
Figure 6:
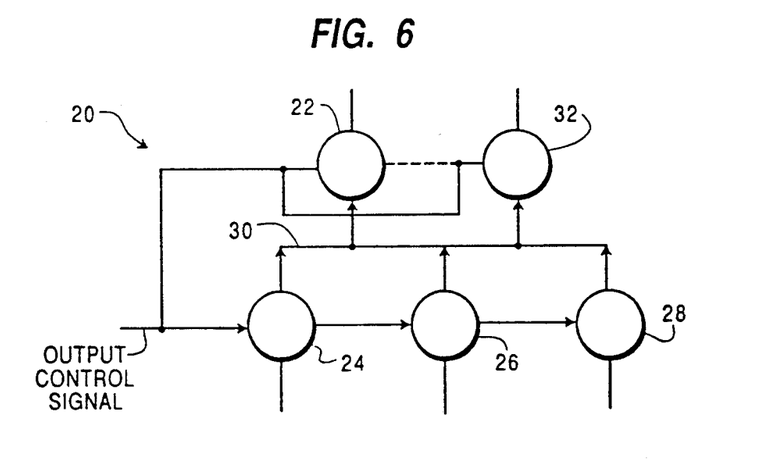
FIG. 6 depicts the network of FIG. 5 including the present invention.

Consider a simple case of a 2-layer, 5-node network 20 as illustrated in FIG. 5. There are three arrows pointing to node 22 representing the flow of data from nodes 24, 26 and 28. Because nodes 24, 26 and 28 all output data to node 22, they all share the same communication channel 30 shown as a dashed line. FIG. 6 shows the actual communication channel 30 or bus shared by nodes 24, 26, and 28. The data output from nodes 24, 26, and 28 are written onto the communication channel sequentially. The order in which the nodes output is specified by the order in which the nodes are connected to the propagated output control signal. In FIG. 6 the nodes are connected in the order 24, 26 and 28, so that is the order in which the nodes will output their data onto the communication channel 30. The actual order is immaterial so long as the nodes which input data have the capability to serially process or store the communicated data.

Figure 7:
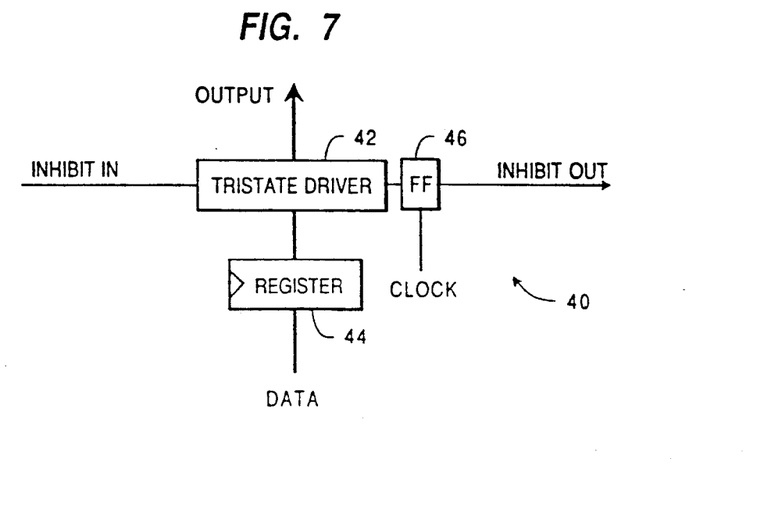
FIG. 7 is an output circuit of the present invention.

The output control circuit 40 for this sequential output is shown in FIG. 7. Every node has a tristate driver 42 at its output outputting the contents of a storage register 44. The control signal (inhibit) is serially connected ("daisy chained") from one node to another. When a system controller sends a signal to the first node in the sequence, the first node will output its data and, after a one clock delay due to the flipflop register (FF) 46, signal the second node. The clock delay must be large enough to allow the active node to output its data value. This daisy chain signal will proceed along the chain until the entire chain is completed and all the data is passed from one layer to the next.

All the nodes which are reading data will have access to the data output by every node in the set, whether it is needed or not. Node 32 of FIGS. 5 and 6 is also connected to the channel 30, uses the data from nodes 24 and 26 and will read the data at the same time as node 22. However, node 32 does not need the data from node 28, but the data will appear on the input of node 32 since node 22 does need it and the inputs are commonly connected. Node 28 is in the same set as nodes 24 and 26 and by definition is connected by the same channel 30. To avoid an error in node 32, the processing mechanism in node 32 must be able to ignore the data produced by node 28. If equation 2 is used as the node transform operation then a zero is explicitly entered as the weight w corresponding to that input.

In FIGS. 5 and 6 the outputs of the nodes 22 and 32 are considered to be independent, that is, an output pathway for the node 22 to an output device, such as a device being controlled, is independent and separate from the output pathway of the node 32 to an output device. That is, under the control scheme of the present invention the nodes 22 and 32 are in independent sets. As a result, the nodes 22 and 32 receive separate, parallel and unchained output control signals. If the outputs of nodes 22 and 32 were connected to a common output channel or bus, and therefore output to the same destination, under the configuration scheme of the present invention the outputs by nodes 22 and 32 would be daisy chained as illustrated by the dashed line in FIG. 6.

Figure 8:
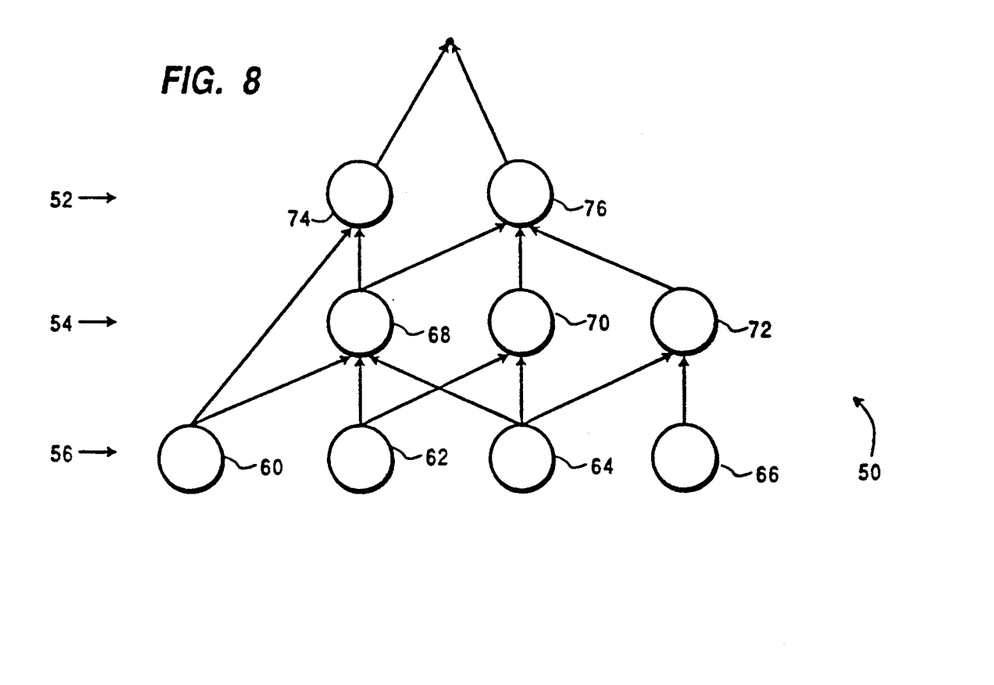
FIGS. 8-12 illustrate other networks which includes the present invention.
Figure 9:
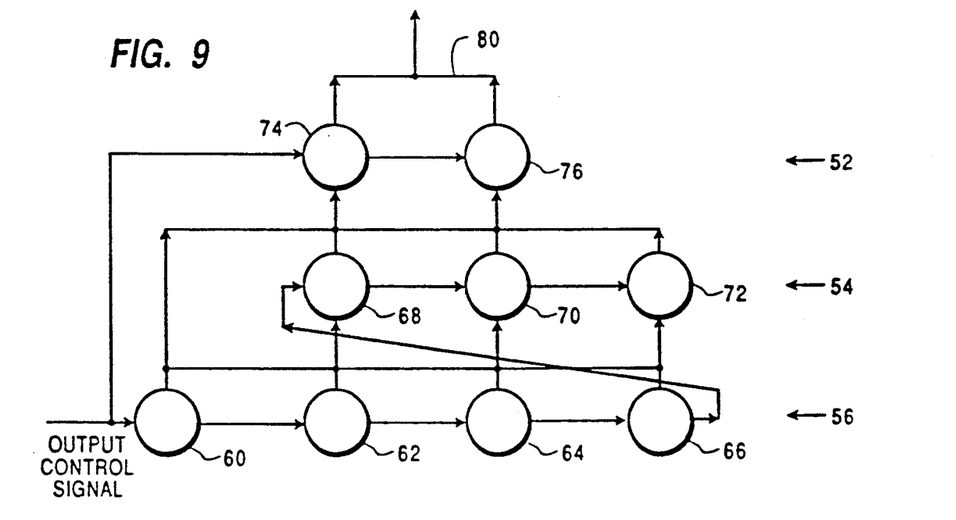

A more complicated network 50 is shown in FIG. 8. The third layer 52 of this network 50 is connected directly to the first layer 56. The physical connections are shown in FIG. 9. In practice this network is similar to the one shown in FIG. 5. Because layer 52 receives data from both layer 54 and layer 56, all the outputs of layer 54 and layer 56 are connected. Node 60 outputs its data first, followed by nodes 60, 62, 64, 66, 68, 70 and 72, in that order. Nodes 68, 70 and 72 must have weights of zero value associated with their own outputs as well as the outputs for the nodes to which they do not send data. For example, node 72 needs a zero weight for the outputs from nodes 60, 62, 68, 70 and 72. Likewise, node 74 must have a zero weight associated with the output of nodes 62, 64, 66, 70 and 72. Node 76 must have zero weights associated with the output of nodes 60, 62, 64 and 66. Note that in contrast to the independent outputs of the output nodes in FIG. 5, the output nodes 74 and 76 share a destination, are therefore in the same independent set and controlled by a daisy chained control signal.

The rate at which a network implementation, in accordance with the present invention, can process data depends on the basic rate at which data is moved and on the interconnections between the nodes. The interconnections define the amount of data which must be time division multiplexed onto each of the channels. The greater the degree of interconnection, the more data must be passed along one channel and the slower the network can process data. If the entire network can be split into independent sets, data can be moved simultaneously along each channel. This reduces the total amount of data moved on each channel and the time required to move it, increasing the overall data rate.

Figure 10:
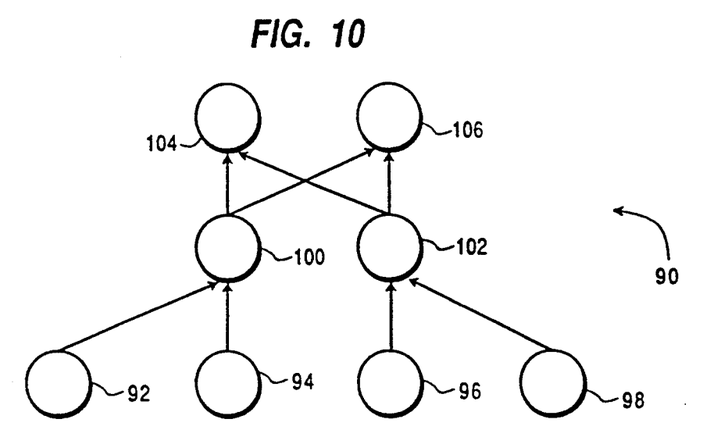
Figure 11:
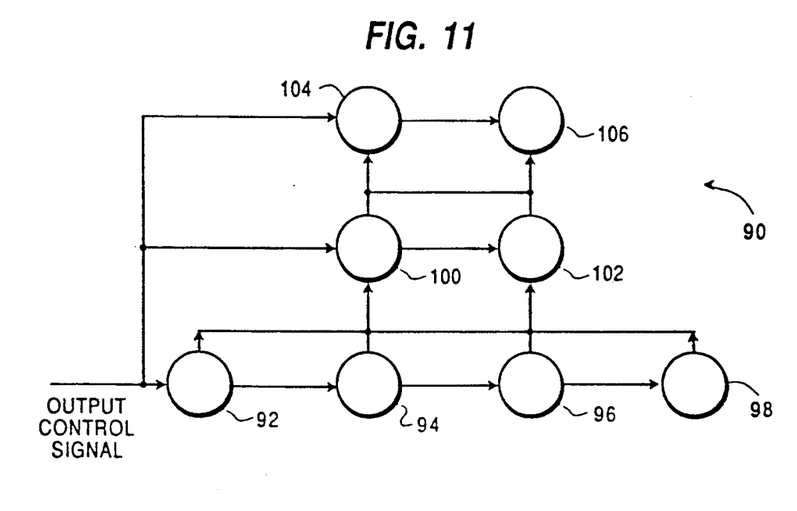
Figure 12:
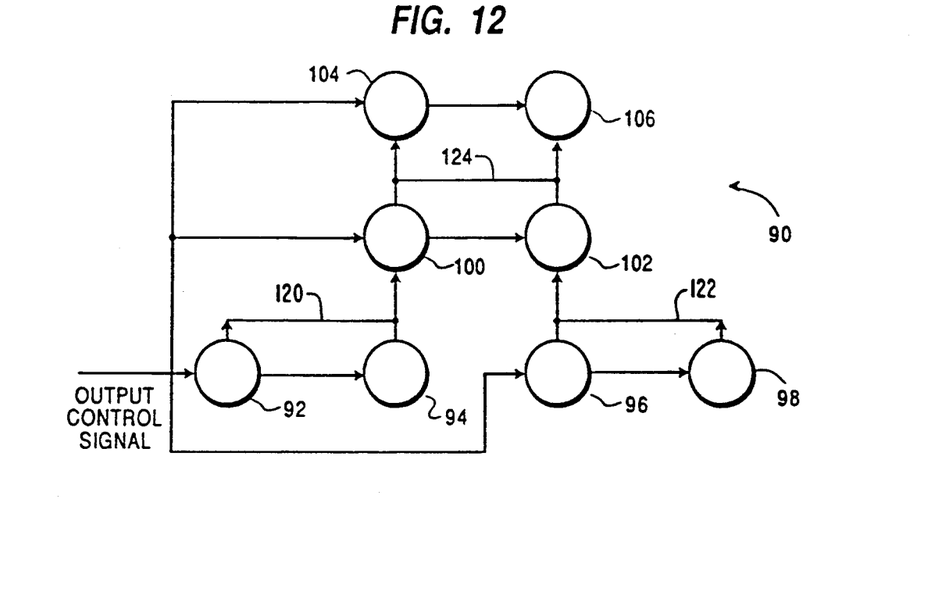

FIG. 10 is an example of a network 90 which can be split in this fashion. FIG. 11 shows a simple connection for network 90. In this arrangement, nodes 100 and 102 must ignore the inputs it receives, but does not use, from nodes 96 and 98 and nodes 92 and 94, respectively. Because nodes 100 and 102 do not share any inputs the network can be split into two independent pieces as shown in FIG. 12. Obviously, it will take half as long to pass 2 values instead of 4. Note that the initial control signal to the output drivers must be sent to both nodes 92 and 96 in this second case, where the case shown in FIG. 11 only requires that the signal be sent to node 92. It is important to understand that in a pipelined system such as this, the entire machine will only proceed as fast as the slowest section. FIG. 11 has two independent output interconnect nets or segments of size 2 (nodes 100 and 102 as well as nodes 104 and 106) and one of size 4 (nodes 92, 94, 96 and 98). In order to provide time to clock all the data of the size 4 net, the other segments will have to wait. Again, providing the other nodes with weights of zero will meet this requirement nicely. The reconfiguration of the network of FIG. 11 into the network of FIG. 12 results in four segments of size 2, thereby removing the wasted cycles.

The process of creating the more efficient version of a network, such as the example discussed above where FIG. 12 is more efficient than FIG. 11 cause node pair 92 and 94 processes in parallel with node pair 96 and 98, is discussed below. First, the nodes are grouped or segmented into sets by destination node. Sets with common members (sets that intersect) are combined within a layer into a common segment. If sets within separate layers have common nodes the layer sets are combined. Each node within a set is connected to a communication channel for each set and the channel is connected to every node that receives an output from a member of the set or segment. Another way of viewing the channel assignment process is that each set is assigned a channel and channels with overlapping or common members are combined. A control signal is passed sequentially to each member of the set in an arbitrary order, however, the order of the signal sequence must match the order of the weights stored in the destination node. One order which will satisfy this requirement is to have the daisy chain control signal start with the lowest layer and work to the highest layer. Each node in the network is thereby not allowed to produce an output until every node upon which it depends has produced an output. Because the output nodes, such as nodes 104 and 106 in FIG. 10, must wait until all lower nodes have produced outputs, a pipelined system such as this will output valid data only after all previous nodes have produced valid outputs.

For the network of FIG. 10 the process works as follows. First the sets (92, 94), (96, 98), (100, 102) and (100, 102) are produced. The sets with common members are combined to produce the sets (92, 94), (96, 98) and (100, 102). Nodes 92 and 94 are connected to a common communication channel 120 (See FIG. 12), nodes 96 and 98 are connected to a common communication channel 122 and nodes 100 and 102 are connected to a common communication channel 124. The channel 120 is connected to all nodes which receive outputs from nodes 92 and 94, that is, node 100, the same applies to channel 122 and 124 where channel 124 is connected to both nodes 104 and 106. Next each independent set is driven by a sequentially passed output control signal producing the network of FIG. 12.

Applying this same process to FIG. 8 to produce FIG. 9 results in first producing the first layer sets (60, 62, 64) (62, 64), (64, 66), the second layer sets (60, 68) and (68, 70, 72) and the third layer set (74, 76). The layer sets with common members are combined producing the first layer set of (60, 62, 64, 66), the second layer set (60, 68, 70, 72) and the third layer set (74, 76). Since some of the layers have sets that have a common member, those sets are combined to produce the set (60, 62, 64, 66, 68, 70, 72) and the set (74, 76). The sets are then provided channels 78 and 80 which connect all source nodes to all destination nodes for that set. Each set is provided an independent control signal that is first passed to each node in the lowest layer and then passed to each node in the next highest layer, etc. producing a configuration as illustrated in FIG. 9.

Figure 13:
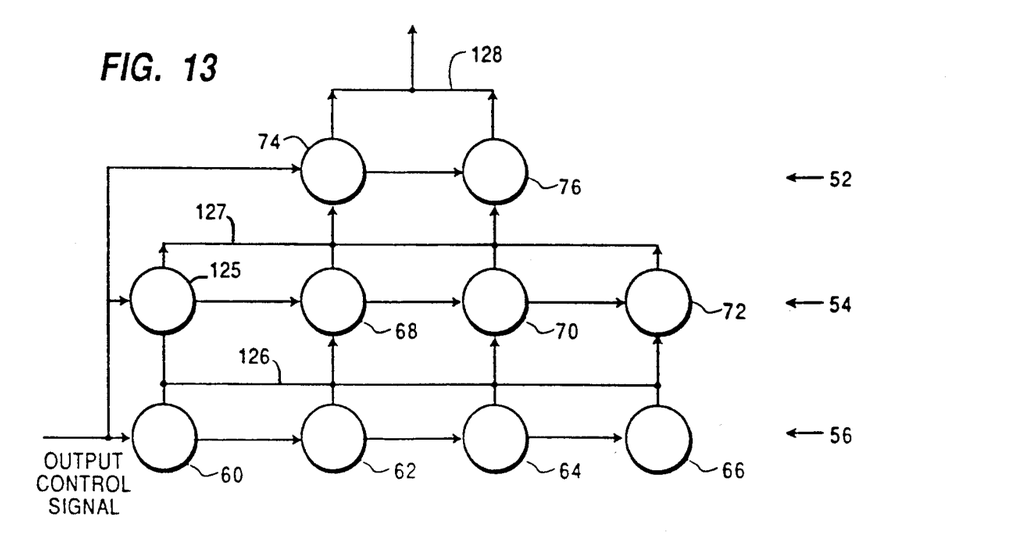
FIG. 13 illustrates a network improved by adding a redundant node.

One advantageous feature of the segmentation approach to neural network design is that it allows the user to increase speed and reduce connectivity in some cases by adding only a few redundant nodes to the network. For example, if a redundant node 125 is added between nodes 60 and 74 of FIG. 8, the network of FIG. 13 will result rather than the network of FIG. 9. This results in a more efficient network which includes three segments: nodes 60, 62, 64 and 66, nodes 125, 68, 70 and 72 and nodes 74 and 76; and three communication channels 126, 127 and 128. The largest segment includes four nodes instead of seven, thereby improving the speed of the network at the cost of adding a single node and a single communication channel.

To this point, the description has focussed on passing processed data from one node to another to implement the processing of data by the network. This node-controlled communication method will also support learning stage processing for a neural net. There is one important difference in control, however. When passing data forward up the network, a single value can be output to multiple nodes as is shown in FIG. 12. When training, it is often the case that each of the multiple nodes which receive the same value must pass back a different training value. Therefore much more data is involved. Each node can receive a training vector. Each element of the vector is returned from each node to which it originally passed a value. The output control signal is readily used to implement this situation. An upper node must pass a value to each of the nodes below it. Thus, the control signal can be propagated along each of the nodes indicating which node should receive the data. After every node in the set has received its appropriate data, the signal starts again at the beginning. At the same time the control signal for the upper nodes is passed to the next node. Thus the upper signal is propagated to one node each time the lower signal is propagated through the entire set.

A digital neural network should provide as much flexibility as possible. Especially, any system must be able to accommodate different network sizes and configurations. Additional flexibility in the functional transforms would also be very useful. The preferred embodiment of the present invention is intended to implement a digital feed-forward network with a maximum of 1024 nodes per layer, and 1024 inputs to each node which is designed for image recognition particularly in an optical character reader. However, networks of other sizes including nodes which are not digital can be implemented. The preferred embodiment is one in which the learning phase of the network is finished so that the interconnectivity as specified by the weights is settled. However, it is possible for a single network structure to implement multiple neural networks. If two differently connected networks can be broken into the same segmented network structure, then both networks can be implemented with the same segmented network structure. The weights in this situation would be used t differentiate between the connectivities of nodes within the segment for each of the neural networks.

Figure 14:
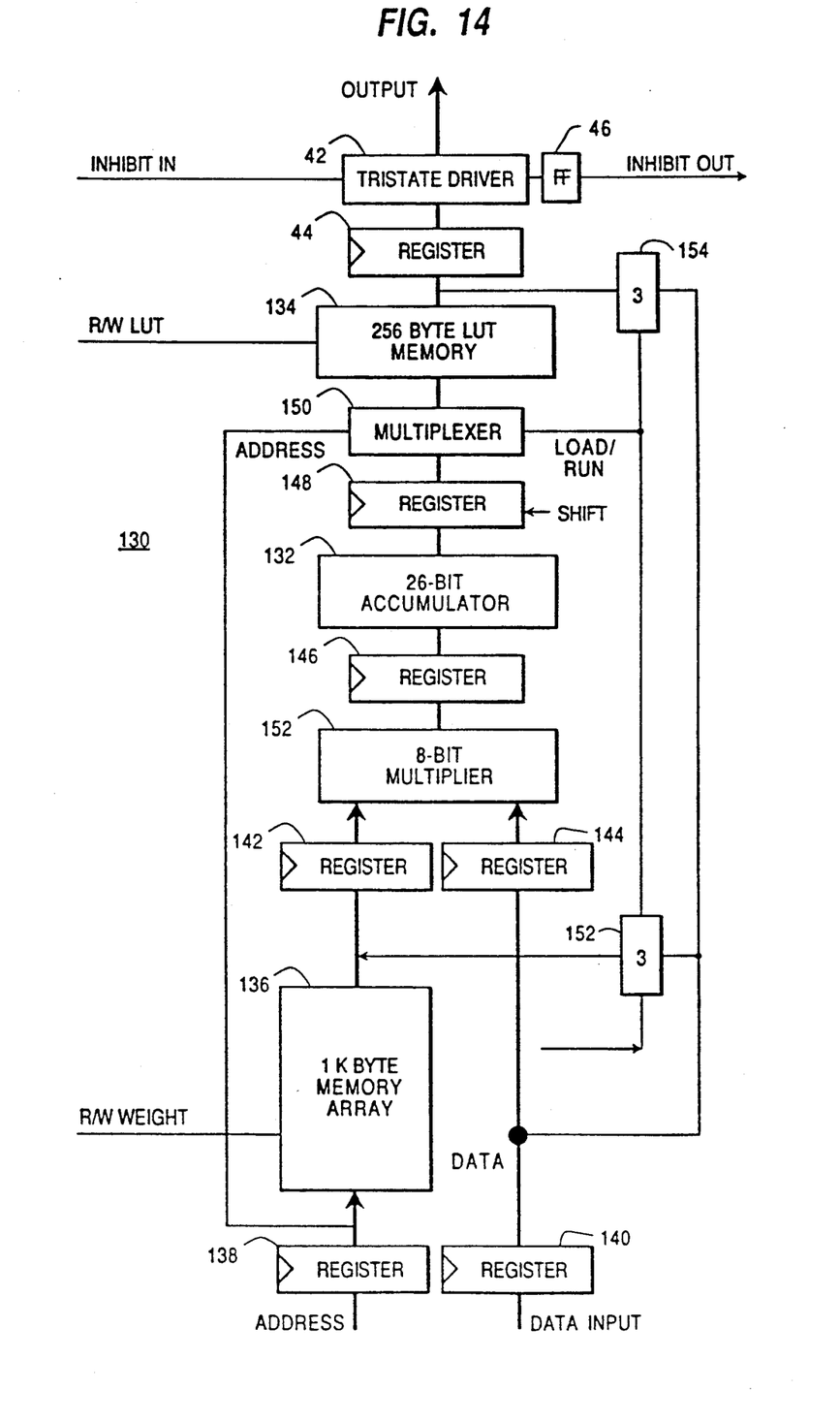
FIG. 14 illustrates the components of a node.

In each node 130, as illustrated in FIG. 14, for economic as well as precision reasons, eight-bit integer arithmetic is used, with a 26-bit accumulator 132 for calculating the sum of products. The functional transform is done with a 256-byte lookup table RAM memory 134 so that different functions can be used. Notice that this precludes any function not of the form of equations 2 or 3. The network is essentially a pipelined synchronous set of identical elements. Each node in the neural net has a corresponding physical node 130. There are no virtual nodes. Because of the pipeline structure, the system will output invalid data until the pipeline within each node within each layer and between layers is full. The number of cycles that are required can be computed by a person of skill in art from the largest width set in each layer and the number of layers in the deepest portion of the network. However, once the pipeline is filled, a valid output is produced for each cycle of the widest segment or set.

A 1 k byte memory array 136, as illustrated in FIG. 14, preferably holds 1024 8-bit weight values. Eight bit arithmetic is chosen because it is appropriate for implementing a 1024 node system with the current integrated circuit technology and provides an appropriate level of precision. If a different size network or a different precision were desired or if a technology allowing the designer to pack more circuits into a smaller area were available a different bit width arithmetic may be appropriate. The registers 138, 140, 142, 144, 146, 148 and 44 provide a one clock delay for the data. The lower four registers 138, 140, 142 and 144 are preferably 8 bits each. Preferably, the register 146 following multiplier 152 is 16 bits, the register 148 following the accumulator 132 is 26 bits, and the register 44 following the LUT (look up table) 134 is 8 bits. Data moves in the direction of the arrows. The 8-bit input data is initially presented at the input concurrently with a 10-bit address value. These two values are clocked into the lowest registers 138 and 140 with the first clock cycle. The address data then produces an 8-bit weight output from the memory array 136 which is clocked into the second register 142. At the same time the input data moves into the corresponding register 144. Since the entire system is pipelined, new data and input addresses are presented to the first registers 138 and 140 at this time. The weight value and input data are multiplied in the 8-bit multiplier 152 to produce a 16-bit result which is clocked into the following register 146. The 26-bit accumulator 132 sums its own register contents with the multiplier result and stores the sum back in its own register. Data continues to be presented in this fashion to the accumulator 132 until all the input data has been clocked in. The accumulator 132 is then shifted left to present the 8 most significant bits to the register 148. This is necessary to accommodate the various magnitude values generated at different points in a network. The top 8 bits of the accumulator 198 are then presented to the lookup table memory (LUT) 134. This table 134 performs an arbitrary function transform depending on the data with which it is loaded. Typically this transform will implement a sigmoid function. The 8-bit output of the table 134 is stored in the last register 44 and output when the inhibit signal is released.

Obviously, by changing the system requirements to 12-bit arithmetic, the memories, accumulators, etc., become much larger. Similarly, reducing the bit precision to 4 bits would vastly reduce the size of a node. Rounding off data in the accumulator 132 or multiplier 152 would also reduce the size of the node and may have little effect on the performance. A clear line (not shown) is provided to reset all registers to a known state and a clock line (not shown) latches data into the registers. Data can be loaded into the memory arrays 134 and 136 by latching an address and data into the input lines just as when processing. The address is normally presented to the weight array 136, but when performing loading operations, it must also be presented to the LUT 134. This can be accomplished with an address multiplexer 150 whose inputs are from the registers 138 and 148. In one mode, the LUT 134 will receive its address from the output of the accumulator register 148, in the second from the input address register 138. During data loading into memories 134 and 136, data is presented to the outputs from tristate drivers 152 and 154 which are controlled from a load/run signal. In the load state, the drivers 152 and 154 turn on, driving the data pins on the memories 134 and 136 to the input data values from register 140. In the run state, the drivers 152 and 154 are off and data is output normally. Since the memories 134 and 136 run independently and all the time, they are permanently selected and active. Control over which memory is loaded comes from the respective R/W signal.

Figure 15:
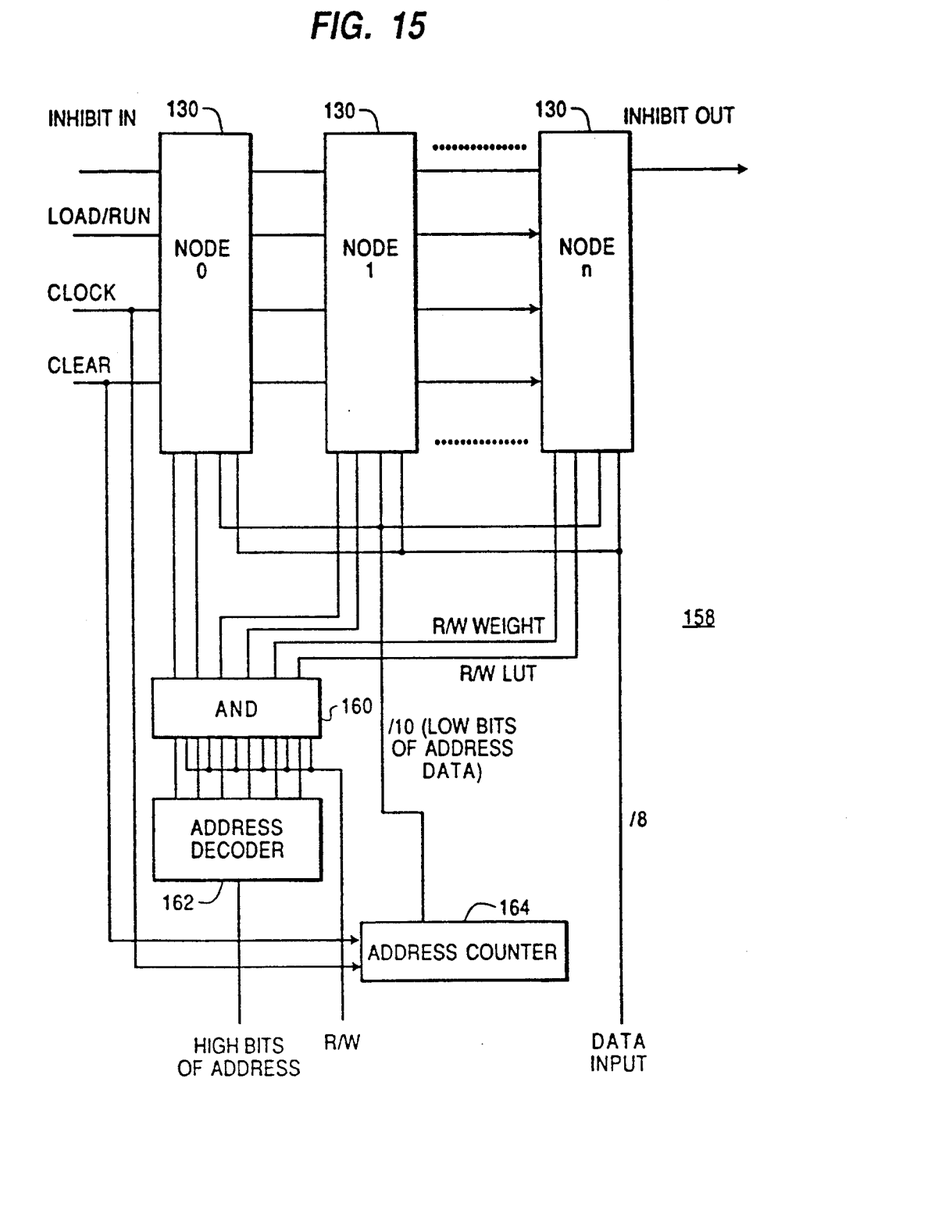
FIG. 15 illustrates the components of an integrated circuit.

It is preferred that as many nodes as possible be placed on each integrated circuit, however, in practice, because of todays integrated circuit technology limitations, it is preferred that several, preferably 8, nodes 130 be placed in a single VLSI circuit 158, as illustrated in FIG. 15 using a technology such as CMOS because of its high density. The connections or channels between nodes or between circuits which provide for the data and the address of the weight are provided in a conventional straight forward manner using conventional data buses. The clear, clock, load/run, and address (low 10 bits) are passed commonly to every node 130. The R/W signal is ANDed by an AND gate 160 with the decoded result of the high address bits produced by a decoder 162 to control which memory 134 or 136 is being loaded. Each memory block in the VLSI circuit 158 must have its own address assignment. When in the load mode, only the memory block being addressed is enabled, in run mode every block is enabled. Each circuit has its own address as well. It is possible to either generate the 10-bit weight address internally with a counter 164 or pass it to each circuit 158. Internal generation reduces the number of input pins and amount of data passing around, but reduces the flexibility of control. If internal generation is used, the counter 164 must be cleared at the start of each data loading operation or run operation together with all the registers.

Figure 16:
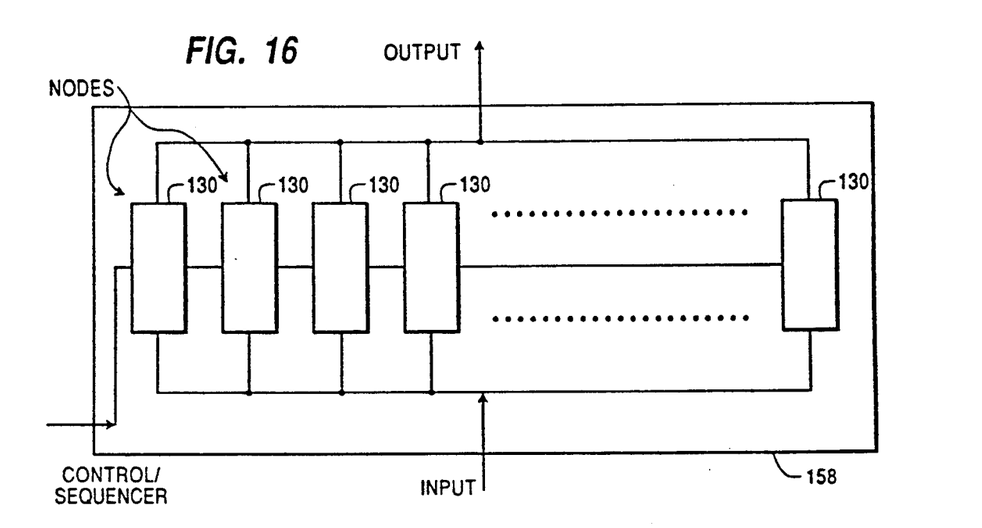
FIGS. 16-18, illustrate alternate connection configurations for an integrated circuit.
Figure 17:
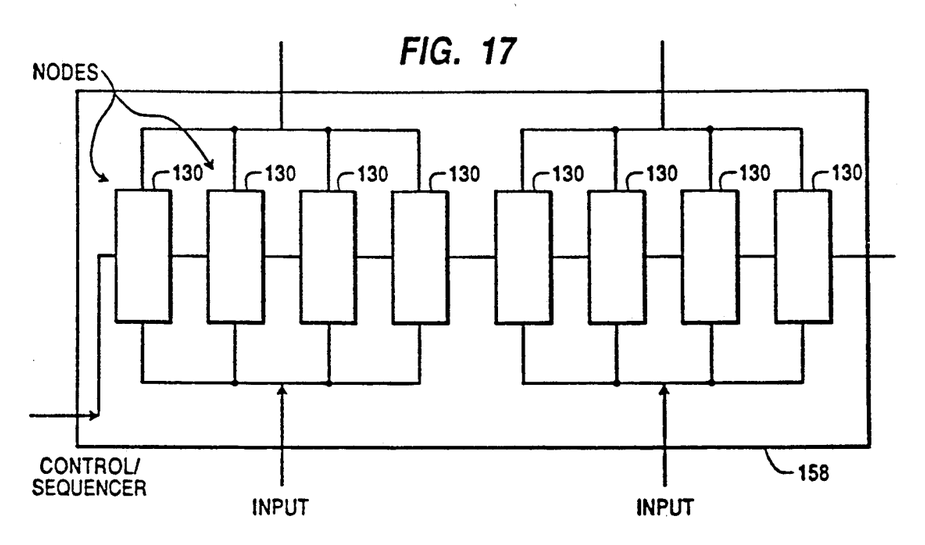
Figure 18:
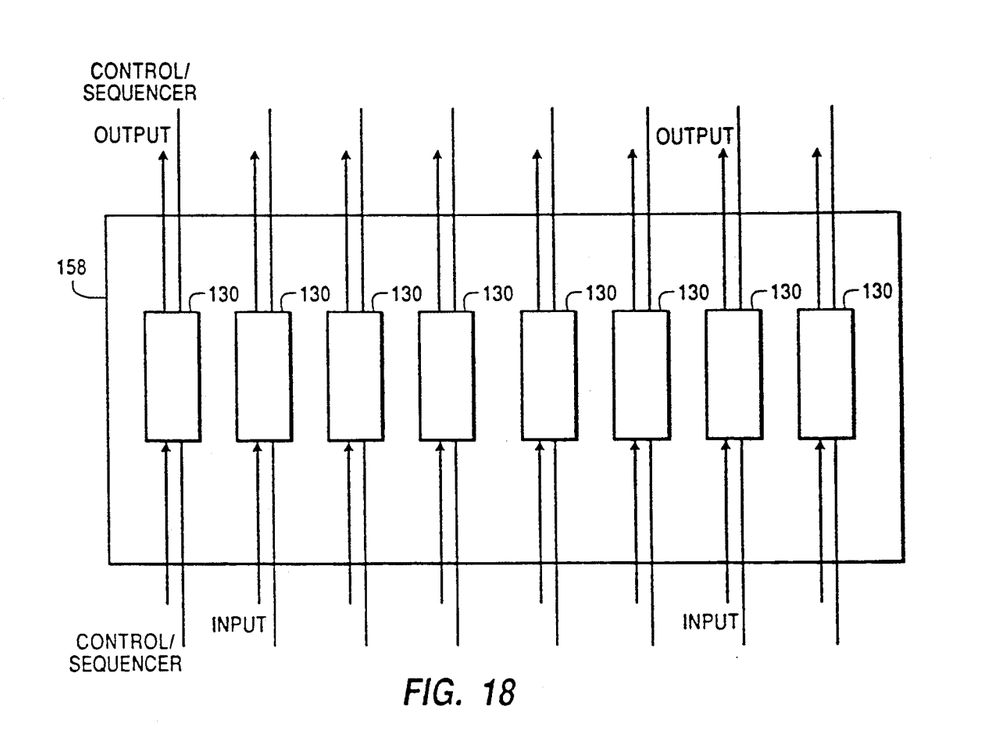

One further problem for multiple node circuits 158 remains. Since the data is multiplexed on each nodes input and the address is passed to every node, the pin count on the circuit is very low. Referring to the previous network figures it is clear that very often the data inputs and outputs are simply connected together as illustrated in FIG. 16. The inputs and outputs of the nodes in a multiple-node circuit could also be connected on the circuit 158 as shown in FIG. 17. This also reduces the pin count so that plenty of pins are available and the nodes are arranged in groups facilitating the network segmentation previously discussed. If all the nodes share a common input and output it is likely that nodes will occasionally be wasted because they cannot be connected at the appropriate place. Dividing the nodes into separate groups helps reduce the wasted nodes at the price of additional input, output, and inhibit pins on the circuit 158. Input and output lines could also be shared differently and other schemes are easy to devise. The extension of the grouping approach results in the circuit of FIG. 18 which should be used if sufficient pins are available in the package. All of the outputs of nodes within a segment, whether outputs of the nodes in each circuit are all tied together as in FIG. 16, or all separately provided, must be tied together to a common channel. For example, if the segment has 6 nodes and a circuit with 8 nodes is being used such as FIG. 16, then the output of the circuit is connected to the segment channel and two nodes on the circuit are wasted. If however the segment has 12 nodes and a FIG. 16 circuit is being used, then the output of both circuits must be connected to the same channel, the circuits must sequentially receive the daisy chain signal and 4 nodes are wasted. In this last situation an implementation such as in FIG. 17 where sets of 4 nodes have an output in common would be more efficient. Thus for efficiency purposes it may be appropriate to have four different types of circuits each having 8 nodes, where one circuit has all nodes tied to common inputs and outputs, a second circuit has groups of 4 nodes, a third group of two nodes and a fourth all nodes with separate outputs. However, because of the concerns related to mass production the choice of which type of circuit to manufacture depends on the number of pins available on the circuit.

Figure 19:
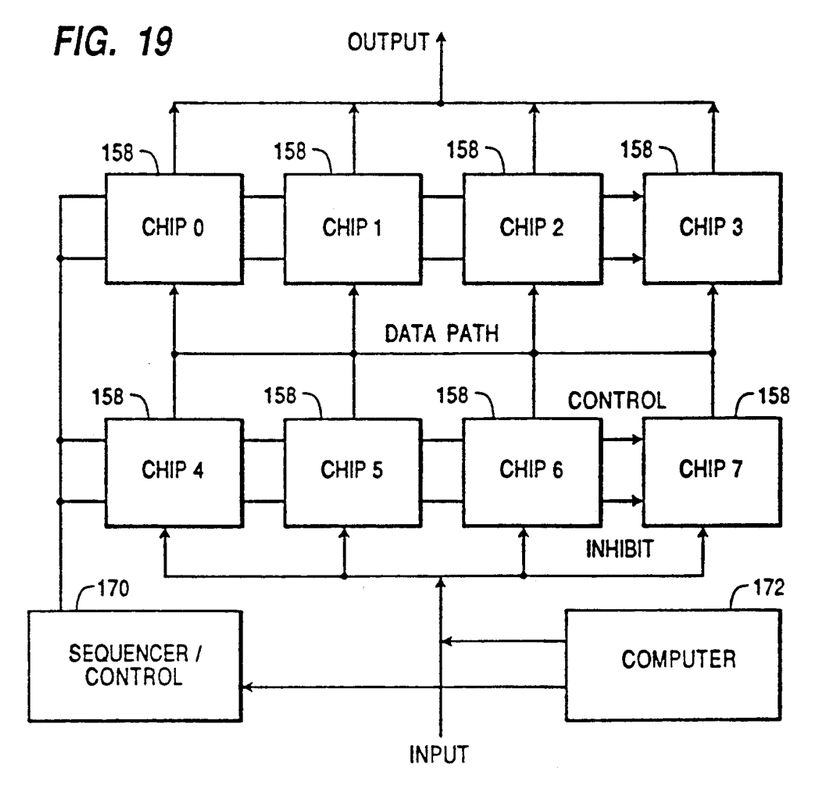
FIG. 19 illustrates a network implemented with multiple integrated circuits.

FIG. 19 shows a higher level view of the system. Once the circuits 158 are connected to implement the desired network, the task of the sequencer 170 is simply to control the inhibit signal and reset the address counter 164, if it exists, at the end of the cycle of the widest layer. The system can then run itself with every node running in parallel. To load the appropriate values, the sequencer 170 or a host computer 172 must generate the appropriate addresses and data values and control the action of the network, a task within the skill in the art. This network embodiment assumes a 3-layer network (counting the input hardware as the first layer) of 64 nodes per layer and complete interconnection between layers. The input must be multiplexed through some additional hardware and synchronized with the network clock. The sequencer/control circuitry 170 runs the whole system, generating the addresses and timing the inhibit signal for both layers. In this network the outputs will be available sequentially (since they are connected) or could be made available on the outputs of each individual chip. Appropriate test points should also be included. For example, the various registers should have their outputs multiplexed together and brought off-circuit for examination during testing. It is also possible to completely test each node by careful selection of test inputs. If the LUT 134 contains a ramp function and either the inputs or weights are set to one, any point in the pipeline can be readily clocked to the output. This approach can easily demonstrate the correctness of the overall logic.

The present invention has several advantages over the prior art. First, this invention can implement any neural net, regardless of its interconnection or composition. Second, this invention provides a simple way to interconnect processing nodes for any network, no matter how dense, and can be extended to arbitrarily-sized networks and connected networks. Third, the performance of a network constructed using this invention can degrade gracefully as its interconnection complexity increases. On the other hand, if the network can be made simpler or less densely connected, system performance increases. Fourth, the system control for this invention is exceedingly simple and is automatically performed, once started, by the nodes themselves. This makes the complex system easy to use. Fifth, this invention is appropriate for implementation with the very large scale integrated circuit construction technology available today. Sixth, the system allows the efficiency of the network to be easily improved by the insertion of one or more redundant nodes.

The many features and advantages of the invention are apparent from the detailed specification and thus it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A neural network, comprising:
   first and second coupled neural node layers, said first layer comprising:
      a first group of neural nodes, each node in said first group outputting to a first destination in said second layer;
      a second group of neural nodes each node in said second group outputting to a second destination in said second layer different from the first destination;
      a first channel connected between said first group in said first layer and the first destination in said second layer; and
      a second channel different from said first channel and connected between said second group in said first layer and the second destination in said second layer.

2. A network as recited in claim 1, wherein each node includes an output inhibit circuit responsive to a control signal, the inhibit circuits within said first group being connected in series to provide the control signal to the inhibit circuits sequentially.

3. A neural network as recited in claim 2, further comprising:
   a weight memory array storing node weights;
   a multiplier connected to said weight memory array;
   an accumulator connected to said multiplier to produce an accumulation output;
   a function memory connected to said accumulator and said output inhibit circuit, and producing a neural node function output responsive to the accumulator output.

4. A network as recited in claim 1, wherein said first and second groups are mutually exclusive 5. A network as recited in claim 1, further comprising means for causing the nodes of at least one of said groups to output sequentially.

6. A network as recited in claim 1, wherein said first and second groups are formed on first and second integrated circuits respectively, said first integrated circuit including the outputs of the nodes of said first group connected to each other and to said first channel, and said second integrated circuit including the outputs of the nodes of said second group connected to each other and to said second channel.

* * * * *